United States Patent Office 3,233,968
Patented Feb. 8, 1966

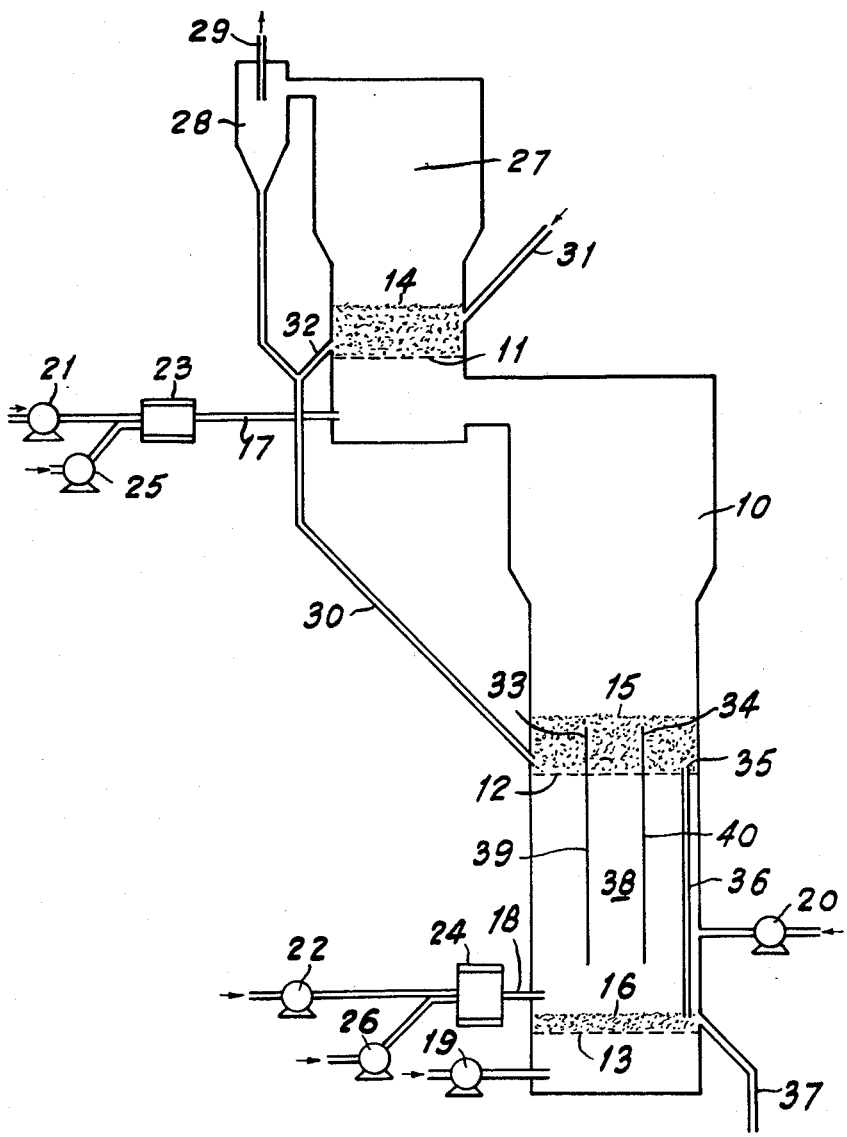

3,233,968
MANUFACTURE OF CONDENSED PHOSPHATES
Adolf Koebner, St. Bees, Cumberland, and Robert H. Edwards, Whitehaven, Cumberland, England, assignors to Marchon Products Limited, London, England, a British company
Filed Apr. 24, 1962, Ser. No. 189,755
Claims priority, application Great Britain, Apr. 25, 1961, 14,907/61
6 Claims. (Cl. 23—106)

The invention relates to a process for the production of condensed phosphates.

It is to be understood that the term "condensed phosphates" is used herein to refer to compounds containing, per molecule, at least two phosphorus atoms linked together by an oxygen atom. Examples of such compounds are the pyrophosphates, triphosphates, metaphosphates and polyphosphates of alkali metals.

It is well-known that alkali metal pyrophosphates and triphosphates may be produced by drying solutions of alkali metal phosphates and calcining the dried product in a kiln. The drying and calcining may be carried out in the same or in separate equipment.

It is also well known to subject solid materials to processes involving the addition of heat by forming a fluidised bed of the pulverised material. We have attempted to employ this method for the production of condensed phosphates but have found that such attempts are unsuccessful owing to the formation of sticky materials which are deposited on the walls of the fluid bed apparatus.

We have now found that this difficulty may be largely overcome by maintaining in and as part of the fluidised bed a substantial amount of already condensed phosphates.

Accordingly, the present invention provides a process for the manufacture of condensed phosphates which comprises calcining an alkali metal orthophosphate or mixture thereof, said orthophosphate or mixture constituting a fluidised bed in which there is also maintained in and as part of the bed a substantial amount of already condensed phosphates.

A suitable amount of condensed phosphate is preferably at least 50% based on the total weight of reaction mixture constituting the fluidised bed.

By the use of a fluidised bed, which is made possible by the present invention, the temperature and residence time of the phosphates may be strictly controlled so that complete reaction can be obtained without substantial overheating and formation of by-products. Also, the control of temperature which is possible using a fluidised bed allows improved control of the formation of the different crystalline forms of the condensed phosphates. Thus a product containing any desired ratio of the different crystalline forms can be obtained.

The fluidised bed may be a stationary fluidised bed in which the gas velocity is sufficient to fluidise the material but is insufficient to entrain any substantial proportion of it, or an entrainment bed, in which the gas velocity is sufficient to entrain a substantial part of the material. The entrained material is separated from the gas by any known means e.g. a cyclone.

The process of the present invention may be carried out (a) batch-wise, (b) as a continuous process in a single fluidised bed or (c) as a continuous multi-stage process in a series of fluidised beds, this latter method being preferred owing to the relatively slow rate of conversion of the orthophosphates to condensed phosphates.

In all three modifications the orthophosphate or mixture of orthophosphates supplied to the fluidised bed may be in the form of a solution or solid or a mixture of solution and solid. In the batch process, and initially in the continuous processes, the bed used for starting contains the desired amount, for example 50%, of condensed phosphates, as referred to above.

In a continuous single-stage process in which complete conversion to condensed phosphates takes place in one reactor, the proportion of condensed phosphates in the bed will remain substantially constant, for the condensed product will be withdrawn at the same rate as the orthophosphate is introduced.

In the case of a continuous multi-stage process, the conversion is not completed until the last reactor. In the first reactor only partial conversion will take place. In order to ensure that a given proportion of the fluidised bed consists of condensed phosphates, the conditions in this reactor may be such that the rate of conversion to condensed phosphates is at least equal to this proportion. Alternatively, if it is desired to operate the reactor under conditions such that the conversion rate is less than the said proportion, the latter may be maintained by re-cycling a part of the condensed phosphates issuing from the final reactor. It will be understood that the proportion of condensed phosphates in subsequent reactors will in either case be greater than that in the first reactor.

Suitable apparatus for carrying out the process continuously is shown diagrammatically by way of example in the accompanying drawing.

10 is the main reactor body in which there are grids 11, 12 and 13. 14, 15 and 16 are stationary fluidised beds, the material constituting each bed being fluidised by air and combustion products, which enter the reactor by means of pipes 17 and 18, and by air which enters the reactor by means of pumps 19 and 20. 21 and 22 are fuel pumps and 23 and 24 are furnaces in which fuel is burnt by air from pumps 25 and 26 respectively. Fine dust carried above the bed 14 is removed from the waste gases partly in the expanded region 27 of the reactor and partly in a cyclone 28, from which the gases escape via a pipe 29. Dust collected in the cyclone is returned to bed 15 through a pipe 30.

Orthophosphate, entering the reactor at inlet 31, constitutes fluidised bed 14 and is pre-heated by means of the furnace 23. The pre-heated orthophosphate leaves this fluidised bed through outlet 32, passes down pipe 30 and enters fluidised bed 15. This latter bed is divided by means of baffle plates 33 and 34, which prevent orthophosphate from reaching outlet 35 without spending an adequate time in the fluidised bed.

In the bed 15 orthophosphate is fluidised and converted into polyphosphate which leaves the fluidised bed at 35 and passes down pipe 36 into fluidised bed 16. Here, the polyphosphate gives up its heat to air entering from pump 19 and passes down pipe 37 as the desired product.

The hot gas space 38 is divided by means of baffle plates 39 and 40 which, together with air inlet 20, are so arranged that each compartment of fluidised bed 15 is kept at the desired temperature. More heat is required for the compartment first entered by the raw material than for subsequent compartments. The first compartment is heated by hot combustion gases only, entering the reactor via pipe 18. Each subsequent compartment receives progressively more air from inlet 20 so that there is a progressively lower temperature of gas/air mixture in the subsequent compartments.

The above reactor may be one of several connected in series in which the orthophosphate is gradually converted in stages and is not fully converted into condensed phosphates until the final reactor.

The following example, in which all percentages are by weight serves to illustrate the invention:

(a) *Preparation of sodium orthophosphate.*—Phosphoric acid was neutralised in known manner with sodium carbonate to an atomic ratio of sodium to phosphorus of 5:3. The resulting solution of monosodium phosphate and disodium phosphate was filtered, concentrated and dried on a drum drier to produce a sodium orthophosphate flake.

(b) *Preparation of condensed phosphate reserve for use according to the process of the invention.*—A portion of the sodium orthophosphate flake prepared in (a) was calcined in known manner in a rotary kiln. The product contained 92% of sodium triphosphate ($Na_5P_3O_{10}$) and 1.1% of sodium metaphosphate ($Na_3P_3O_9$).

(c) *Preparation of condensed phosphates according to the process of the present invention.*—2½ lbs. of sodium orthophosphate flake, prepared in (a), was mixed with an equal mass of sodium triphosphate prepared in (b), and the mixture ground and sieved to a particle size between the No. 30 B.S. sieve and the No. 10 B.S. sieve. This mixture was fluidised in a reactor of 25 square inches cross-section by passing through it hot air at such a rate that the pressure drop through the bed was 10 inches of water. The average temperature in the bed was 445° C. After 2½ hours, the material was withdrawn and, on analysis, found to contain sodium triphosphate—94% and sodium metaphosphate—0.7%.

The temperature rise test as described by J. S. McGilvery in ASTM Bulletin 1953, No. 191, 45–48 was carried out on the material and found to be 10.5 centigrade degrees shown that the material contained 18% of the Phase I crystalline form of sodium triphosphate.

What we claim is:

1. In the process for manufacturing sodium condensed phosphates wherein a mixture of monosodium orthophosphate and disodium orthophosphate is calcined at elevated temperatures by the upward passage of a heated gas through a fuidized bed consisting of particles of said sodium orthophosphates and particles of sodium condensed phosphates, said sodium orthophosphates thereby undergoing thermal dehydration and forming sodium condensed phosphates, the improvement comprising maintaining said sodium condensed phosphates in an amount at least 50% by weight of the total fluidized bed, and withdrawing from said fluidized bed sodium condensed phosphates having substantially the same composition as the sodium condensed phosphates in the fluidized bed while maintaining the fluidized bed to contain at least 50% sodium condensed phosphates by balancing the rates at which said sodium orthophosphates are added to said bed and the rates at which said sodium condensed phosphates are withdrawn from said bed.

2. The process of claim 1 wherein the fluidized bed is at a temperature between 440° C. and 450° C. during calcination.

3. The process of claim 1 wherein a portion of said withdrawn sodium condensed phosphates is recycled to the fluidized bed.

4. In the process for manufacturing potassium condensed phosphates wherein a mixture of monopotassium orthophosphate and dipotassium orthophasphate is calcined at elevated temperatures by the upward passage of a heated gas through a fluidized bed consisting of particles of said potassium orthophosphates and particles of potassium condensed phosphates, said potassium orthophosphates thereby undergoing thermal dehydration and forming potassium condensed phosphates, the improvement comprising maintaining said potassium condensed phosphates in an amount at least 50% by weight of the total fluidized bed, and withdrawing from said fluidized bed potassium condensed phosphates having substantially the same composition as the potassium condensed phosphates in the fluidized bed while maintaining the fluidized bed to contain at least 50% potassium condensed phosphates by balancing the rates at which said potassium orthophosphates are added to said bed and the rates at which said potassium condensed phosphates are withdrawn from said bed.

5. The process of claim 4 wherein the fluidized bed is at a temperature between 440° C. and 450° C. during calcination.

6. The process of claim 4 wherein a portion of said withdrawn potassium condensed phosphates is recycled to the fluidized bed.

References Cited by the Examiner

UNITED STATES PATENTS

| | | | |
|---|---|---|---|
| 2,419,148 | 4/1947 | King | 23—106 |
| 2,600,253 | 6/1952 | Lutz | 71—54 |
| 2,920,939 | 1/1960 | Edwards | 23—106 |
| 3,030,180 | 4/1962 | Bigot | 23—106 |

MAURICE A. BRINDISI, *Primary Examiner.*